Patented Sept. 11, 1923.

1,467,711

UNITED STATES PATENT OFFICE.

GUILLAUME DE MONTMOLLIN, OF BASEL, SWITZERLAND, ASSIGNOR TO SOCIETY OF CHEMICAL INDUSTRY IN BASLE, OF BASEL, SWITZERLAND.

PROCESS FOR THE MANUFACTURE OF INTERMEDIATE PRODUCTS AND NEW DYE-STUFFS DERIVED FROM DIARYLSULPHONES.

No Drawing. Application filed April 23, 1923. Serial No. 634,182.

*To all whom it may concern:*

Be it known that I, GUILLAUME DE MONTMOLLIN, a citizen of the Swiss Republic, residing at Basel, Switzerland, have invented new and useful Processes for the Manufacture of Intermediate Products and New Dyestuffs Derived from Diarylsulphones, of which the following is a full, clear, and exact specification.

In my earlier United States Patent No. 1,359,969 I have described aminoazo dyestuffs obtained by combining diazo derivatives of the mono-acidyl-diaminodiarylsulphones with β-naphthylamine and its various substitution products.

By continuing my researches on these lines I have synthesized a series of new sulfonated ortho-aminodiarylsulphones, characterized, on the one hand, by the presence of two benzene nuclei united by a $SO_2$ group, and, on the other hand, by the presence of their diazotizable $NH_2$ group in one of the ortho-positions in respect of the $SO_2$ group, and, finally, by that of a $SO_3H$ group in one of the two benzene nuclei, which latter may of course carry other substituents yet, as for instance, halogens, $CH_3$, $NHCOR$, etc., groups.

I have further found that there are obtained new acid dyestuffs of great commercial value if the diazo-derivatives of these sulphones, which contain the characteristic group

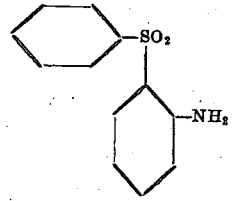

are combined with non-sulfonated aromatic amines containing at least 10 atoms of carbon all belonging to aromatic nuclei, as for instance, the naphthylamines and their derivatives arylated, arylalkylated and alkylated at the nitrogen atom, and the derivatives of aniline and its homologues arylated and arylalkylated at the nitrogen atom. These dyestuffs correspond to the general formula:

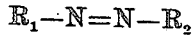

in which $R_1$ signifies the radicle of a sulfonated diphenylsulphone, and $R_2$ the radicle of a non-sulfonated aromatic amine containing at least 10 atoms of carbon all belonging to aromatic nuclei. By the action of reducing agents they can be split into sulfonated o-aminodiarylsulphones containing the following characteristic group:

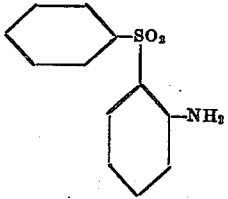

and non-sulfonated aromatic diamines. These dyestuffs constitute, in a dry state, powders varying from orange to brown dissolving in water with orange to bluish-red colorations and in sulfuric acid with yellow to brown and violet colorations. They dye wool in an acid bath in bright shades varying from orange to bluish-red of an excellent fastness to light and to washing.

The following examples illustrate the invention without, however, limiting the same.

Example 1.

41.3 parts of the diazo-derivative of 2-amino-4-acetylamino-4'-methyl-5'-sulfo-1,1'-diphenylsulphone (obtained by condensation of p-toluenesulfinic acid with 2.4-dinitro-1-chlorobenzene, sulfonation, reduction, acetylation and diazotation of the condensation product thus formed) are introduced into a solution of 20.7 parts hydrochloride of ethyl-β-naphthylamine. The dyestuff which is thus very rapidly formed is salted out in an alkaline solution and filtered. It constitutes, in a dry state, a brown-red powder dissolving in water to a bluish-red solution and in concentrated sulfuric acid to a brown solution. It dyes wool in a sulfuric acid bath in very equal bluish-red tints fast to light and to washing.

Substituting in this example the diazo-derivative of 2-amino-4-acetylamino-4'-methyl-5'-sulfo-1,1'-diphenylsulphone by a diazo-derivative of 2-amino-5'-acetylamino-4-sulfo-4'-methyl-1,1'-diphenylsulphone (obtained by condensation of p-toluenesulfinic acid with 1-chloro-2-nitrobenzene-4-sulfonic acid, nitration, reduction, acetylation and diazotation of the condensation product thus formed) there is obtained an analogous dyestuff, whilst the use of the diazo-derivative of the sulfonic acid of 2-amino-5-acetylamino-4'-methyl-1,1'-diphenylsulphone (obtained by sulfonation and acetylation of the 2,5-diamino-4'-methyl-1,1'-diphenylsulphone of the German Patent No. 282,214) yields a visibly bluer product.

*Example 2.*

35.6 parts of the diazo-derivative of 2-amino-4-sulfo-4'-methyl-1,1'-diphenylsulphone (obtained by condensation of p-toluenesulfinic acid with 1-chloro-2-nitrobenzene-4-sulfonic acid, reduction and diazotation of the condensation product thus formed) are introduced into a solution of 17.9 parts of hydrochloride of β-naphthylamine. The coupling being completed, the dyestuff is salted out in an alkaline solution and filtered. In a dry state it constitutes a brick-red powder dissolving in water to a red solution and in concentrated sulfuric acid to a yellow-brown solution. It dyes wool in an acetic acid bath very uniform brick-red tints fast to light and to washing.

If the β-naphthylamine in this example is substituted by the phenyl-β-naphthylamine there results a red dyestuff of analogous properties; the ethyl-α-and-β-naphthylamines lead to bluish-red dyestuffs.

*Example 3.*

40.1 parts of the nitrated diazo-compound of 2-amino-4-sulfo-4'-methyl-1,1'-diphenylsulphone (obtained by condensation of p-toluenesulfinic acid with 1-chloro-2-nitrobenzene-4-sulfonic acid, reduction, diazotation and nitration of the condensation product thus formed) are introduced into a solution of 20.7 parts of ethyl-β-naphthylamine. The dyestuff is very rapidly formed. It is salted out in an alkaline solution and filtered. In a dry form the dyestuff constitutes a red-brown powder dissolving in water to a bluish-red, in concentrated sulfuric acid to a brown solution. It dyes wool in an acetic acid bath very uniform bluish-red tints fast to light and to washing.

*Example 4.*

To 41.3 parts of the diazo-derivative of 2-amino-4-acetylamino-4'-methyl-5'-sulfo-1,1'-diphenylsulphone, suspended in 500 parts of water, there is added a solution of 21.1 parts of ethylbenzylaniline in 11 parts of hydrochloric acid. The dyestuff is very rapidly formed. The coupling is favored by a partial and careful neutralization of the free mineral acid. The dyestuff is salted out in an alkaline solution and filtered. In a dry form it constitutes an orange powder dissolving in water in orange, in concentrated sulfuric acid in yellow solutions and dyes wool in a sulfuric acid bath very equal orange tints, characterized by an excellent fastness to alkalis and to washing and a very good fastness to light.

With diphenylamine in place of the ethylbenzylaniline as coupling component, dyestuffs of a slightly browner appearance are obtained.

*Example 5.*

To 35.6 parts of the diazo-derivative of 2-amino-4-sulfo-4'-methyl-1,1'-diphenylsulphone, suspended in 500 parts of water, there is added an aqueous suspension of 18.3 parts of N-methyldiphenylamine. The coupling takes place very rapidly and is favored by a partial and careful neutralization of the free mineral acid. The dyestuff is salted out in an alkaline solution and filtered. In a dry state it constitutes an orange-brown powder dissolving in water to orange, in concentrated sulfuric acid to violet solutions. It dyes wool in an acetic acid bath very uniform full orange tints, characterized by an excellent fastness to alkalis and to washing and a very good fastness to light.

Substituting the N-methyldiphenylamine by methylbenzylaniline or ethylbenzylaniline there are obtained orange dyestuffs.

The diazo-derivatives of 2-amino-4-sulfo-1,1'-diphenylsulphone or eventually of 2-amino-4-sulfo-4'-chloro-1,1'-diphenylsulphone (obtained according to the indications of example 2 from benzene- or p-chlorobenzenesulfinic acids) yield very similar dyestuffs.

What I claim is:

1. The herein described new dyestuffs obtained by uniting the diazo-derivatives of the sulfonated ortho-amino-diarylsulphones with non-sulfonated aromotic amines containing at least 10 atoms of carbon all belonging to aromatic nuclei and corresponding to the general formula:

$$R_1-N=N-R_2$$

in which $R_1$ represents the radicle of a sulfonated diarylsulphone, and $R_2$ that of a non-sulfonated aromatic amine containing at least 10 atoms of carbon all belonging to aromatic nuclei, which may be split under the action of reducing agents into sulfonated o-amino-diarylsulfones containing the characteristic group:

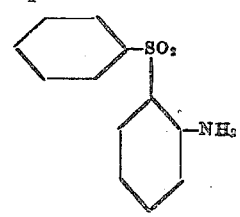

and non-sulfonated aromatic diamines, constituting in a dry state powders varying from orange to brown, dissolving in water from orange to bluish-red solutions, and in sulfuric acid from yellow to brown and violet solutions, and dyeing wool in an acid bath bright tints varying from orange to bluish-red of an excellent fastness to light and to washing.

2. The herein described new dyestuffs obtained by uniting the diazo-derivatives of the sulfonated ortho-amino-diarylsulphones with non-sulfonated aromatic amines other than primary amines containing at least 10 atoms of carbon all belonging to aromatic nuclei and corresponding to the general formula:

in which $R_1$ represents the radicle of a sulfonated diarylsulphone, and $R_2$ that of a non-sulfonated aromatic amine other than a primary amine containing at least 10 atoms of carbon all belonging to aromatic nuclei, which may be split under the action of reducing agents into sulfonated o-amino-diarylsulphones containing the characteristic group:

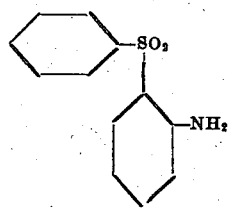

and non-sulfonated aromatic diamines, constituting in a dry state powders varying from orange to brown, dissolving in water from orange to bluish-red solutions, and in sulfuric acid from yellow to brown and violet solutions, and dyeing wool in an acid bath bright tints varying from orange to bluish-red of an excellent fastness to light and to washing.

3. The herein described new dyestuffs obtained by uniting the diazo-derivatives of the sulfonated ortho-amino-diarylsulphones with non-sulfonated aromatic amines other than primary amines containing at least 12 atoms of carbon all belonging to aromatic nuclei and corresponding to the general formula:

in which $R_1$ represents the radicle of a sulfonated diarylsulphone, and $R^2$ that of a non-sulfonated aromatic amine other than a primary amine containing at least 12 atoms of carbon all belonging to aromatic nuclei, which may be split under the action of reducing agents into sulfonated o-amino-diarylsulphones containing the characteristic group:

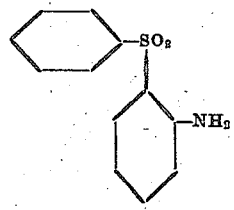

and non-sulfonated aromatic diamines, constituting in a dry state powders varying from orange to brown, dissolving in water from orange to bluish-red solutions, and in sulfuric acid from yellow to brown and violet solutions, and dyeing wool in an acid bath bright tints varying from orange to bluish-red of an excellent fastness to light and to washing.

In witness whereof I have hereunto signed my name this 10th day of April 1923, in the presence of two subscribing witnesses.

GUILLAUME de MONTMOLLIN.

Witnesses:
ARMAND BAUME,
LUCIEN J. PICARD.